April 26, 1932.  H. R. BOWMAN  1,855,820
WEEDER
Filed Jan. 3, 1931  2 Sheets-Sheet 2
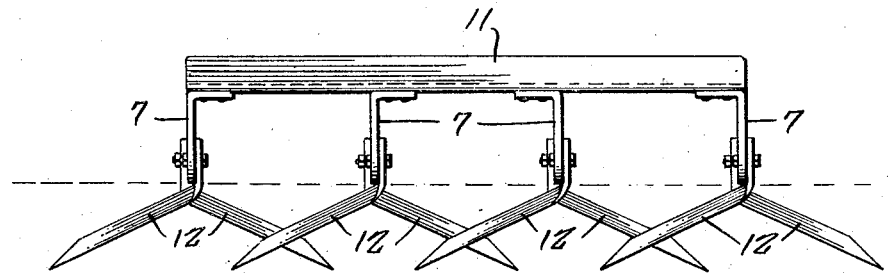
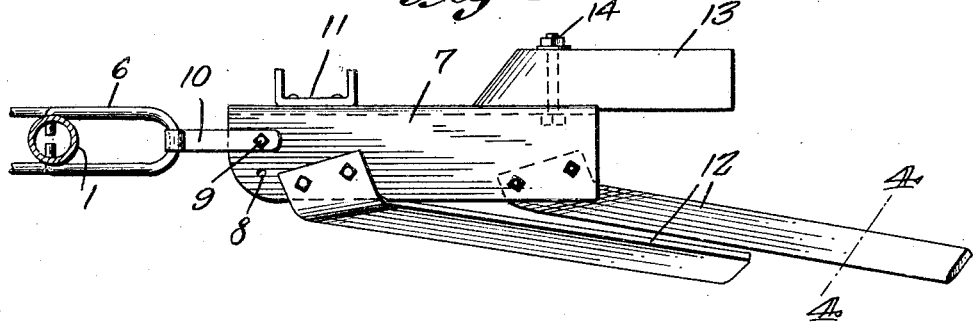
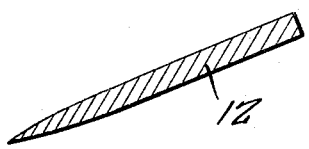
Hugh R. Bowman,
INVENTOR Patented Apr. 26, 1932

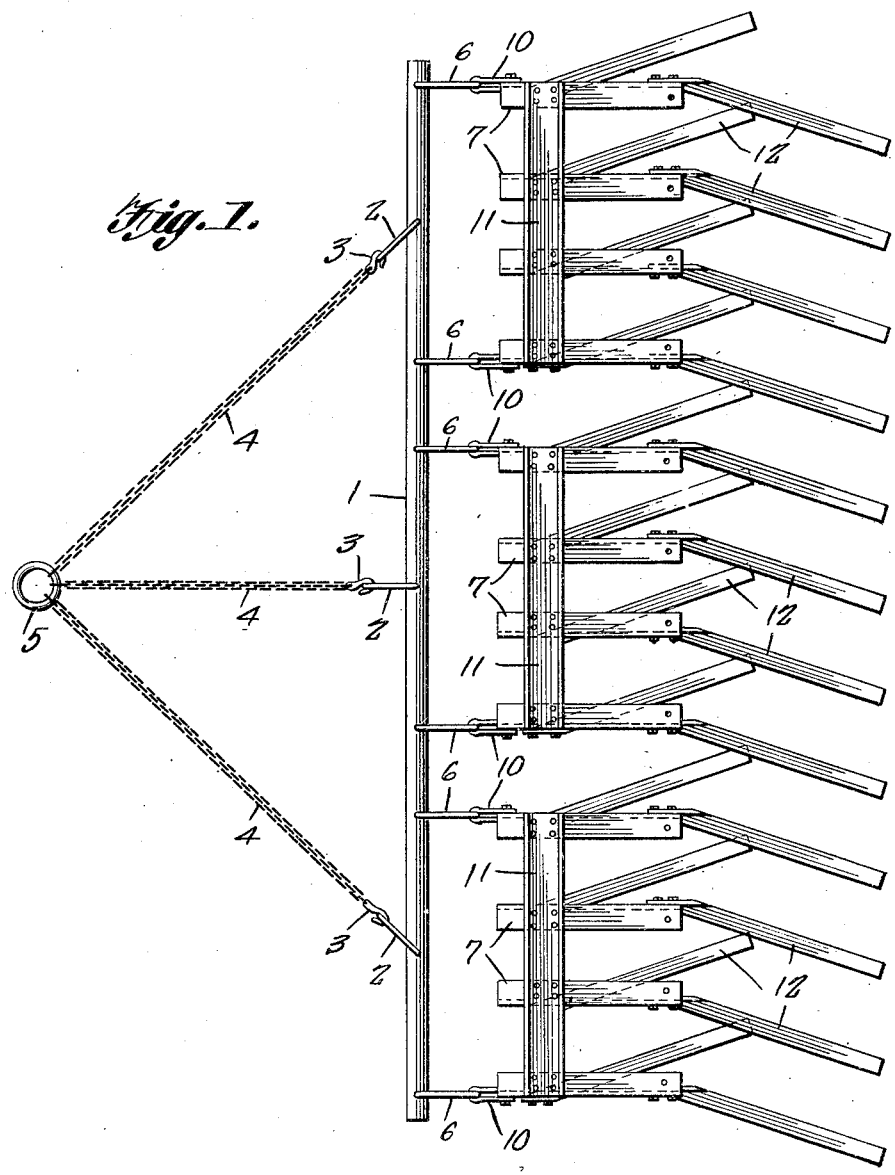

1,855,820

UNITED STATES PATENT OFFICE

HUGH R. BOWMAN, OF SALEM, MONTANA

WEEDER

Application filed January 3, 1931. Serial No. 506,442.

This invention relates to agricultural implements and its general object is to provide a weeder that not only destroys weeds and like vegetation but thoroughly breaks up the ground with the result the implement also acts in the capacity of a surface cultivator.

A further object of the invention is to provide a weeder that is constructed in a manner to prevent the accumulation of vegetation about the parts thereof, and the runners of the implement are arranged and formed for that purpose, as well as to have a tendency to wear in a blade like formation. Therefore, the runners will remain sharp at all times.

Another object of the invention is to provide an agricultural implement of the character set forth, that is reasonably simple in construction, inexpensive to manufacture, and extremely efficient in operation and service.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 1 is a top plan view of the weeder which forms the subject matter of the present invention.

Figure 2 is a rear elevation of one of the cutter sections.

Figure 3 is a sectional view with a cutter section shown in side elevation.

Figure 4 is a sectional view taken approximately on line 4—4 of Figure 3.

Referring to the drawings in detail, the reference numeral 1 indicates an elongated tubular member having arranged therein at equidistantly spaced intervals registering openings for the purpose of receiving clevis link members 2 which are adapted to receive hooks or like fastening members 3, the latter having secured thereto one of the ends of chains 4 while the opposite ends of these chains are secured to a ring 5, whereby the implement can be secured to suitable draft means such as a tractor.

The tubular member 1 is likewise provided with a plurality of registering openings arranged in groups for the purpose of receiving the right angle bent ends of substantially U-shape clevis link members 6 as best shown in Figure 3, and by this construction, it will be apparent that these U-shape clevis link members can be readily associated and disconnected with respect to the tubular member by bending the arms thereof toward or away from each other.

The ground and vegetation cutting means are in sectional form and each of the sections include a plurality of angle iron members 7 which have their lower forward corners rounded, and the forward ends are provided with spaced openings 8 for the purpose of receiving bolt and nut connections 9 for securing clevises 10 that are secured to the U-shape clevis link members as will be noted upon inspection of Figure 1.

The openings 8 are superimposed so that the bolt and nut connections 9 can be associated with either the upper or lower openings 8 so as to adjust the depth of the cutting blades which will be presently described with respect to the ground.

The angle iron members 7 of each of the sections are secured together through the instrumentality of a channel iron member 11 and while I have shown four angle iron members connected together to provide a section, it will be obvious that any number of these angle iron members can be connected, it depending of course upon the size of the implement, and any number of sections may also be employed, but it will be noted that I have shown three sections in the drawings.

The blades which are indicated by the reference numeral 12 have their forward ends bent upwardly and secured to the depending portions of the angle iron members 8. The forwardly disposed blades are secured adjacent the front ends of the angle iron members, upon one side of the depending portions, while the remaining blades are secured on the opposite sides of the depending portions and adjacent the rear ends of said portions. The forward blades extend at an inclination in one direction, from the angle iron members 7, while the rearward blades extend at an inclination in an opposite direction with the result these blades are disposed in converging relation with respect to each other as clearly shown in Figure 1.

The blades are not only disposed at an inclination longitudinally, but are also inclined transversely, as well as being provided with a beveled lower edge so as to form a cutting edge.

In order to increase the cutting depth of the blades 12, it may be desirable to apply a weight such as indicated by the reference numeral 13 to the respective blade carrying sections and this weight has a rounded forward end and is secured to one of the angle iron members 7 of a section through the instrumentality of a bolt and nut connection 14.

From the above description and disclosure of the drawings, it will be obvious that I have provided an agricultural implement in the form of a weeder and surface cultivator that includes cutting blades so arranged and formed whereby weeds and like vegetation will not collect thereon during the use of the implement, and by arranging and forming the blades as set forth, they will remain sharp at all times during the wearing process thereof. The blades are also arranged so that all portions of the ground which the implement covers will be acted upon thereby, as the rearward blades overlie the rear ends of the forward blades.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

In an agricultural implement, cutting means arranged in sections, angle iron members included in each section, a channel iron member for each section and connecting the angle iron members thereof in parallelism with each other, and cutting blades having upturned forward ends secured to the depending portions of the angle iron members and being disposed in forward and rearward groups arranged in overlapped converging relation, said cutting blades being inclined longitudinally and transversely and having beveled ground engaging edges.

In testimony whereof I affix my signature.

HUGH R. BOWMAN.